(12) United States Patent  
Sterling

(10) Patent No.: US 7,170,489 B2  
(45) Date of Patent: *Jan. 30, 2007

(54) POSITIONING A CURSOR ON THE DISPLAY SCREEN OF A COMPUTER

(75) Inventor: Hans Rudolf Sterling, Cape Town (ZA)

(73) Assignee: Ethertouch Limited, Lubuan (MY)

( * ) Notice: Subject to any disclaimer, the term of this patent is extended or adjusted under 35 U.S.C. 154(b) by 121 days.

This patent is subject to a terminal disclaimer.

(21) Appl. No.: 10/634,147

(22) Filed: Aug. 4, 2003

(65) Prior Publication Data

US 2004/0189594 A1    Sep. 30, 2004

Related U.S. Application Data

(63) Continuation of application No. 10/298,025, filed on Nov. 15, 2002, now Pat. No. 6,624,804, which is a continuation of application No. 09/884,149, filed on Nov. 6, 2000, now abandoned, which is a continuation of application No. PCT/IB99/00579, filed on Apr. 6, 1999.

(30) Foreign Application Priority Data

Apr. 6, 1998    (ZA) .................................. 98/2910

(51) Int. Cl.
*G09G 5/08* (2006.01)
*G09G 5/00* (2006.01)

(52) U.S. Cl. .................. 345/157; 345/158; 345/173

(58) Field of Classification Search ........ 345/173–175, 345/156–158, 168, 179; 341/21, 22, 31–33; 178/18.01–18.11, 19.01–19.07
See application file for complete search history.

(56) References Cited

U.S. PATENT DOCUMENTS

| 4,754,268 A | * | 6/1988 | Mori ........................ 345/163 |
| 4,845,503 A | * | 7/1989 | Adam et al. ............... 342/448 |
| 4,988,981 A | * | 1/1991 | Zimmerman et al. ...... 345/158 |
| 5,164,713 A | * | 11/1992 | Bain ......................... 715/862 |
| 5,444,462 A | * | 8/1995 | Wambach .................. 345/158 |
| 5,453,759 A | * | 9/1995 | Seebach .................... 345/158 |
| 5,481,265 A | * | 1/1996 | Russell ...................... 341/22 |
| 5,489,922 A | * | 2/1996 | Zloof ......................... 345/156 |
| 5,914,701 A | * | 6/1999 | Gersheneld et al. ...... 345/156 |

* cited by examiner

*Primary Examiner*—Dennis Doon Chow  
(74) *Attorney, Agent, or Firm*—Reed Smith LLP; Harry K. Ahn

(57) ABSTRACT

A computer system comprises a keyboard (11), a display screen (13), a first pair of position-sensing electrodes (18.1, 18.2), a second pair of position-sensing electrodes (20.1, 20.2), a signal injection electrode (22), and an oscillator (27). The oscillator injects a signal via the signal injection electrode and the operator's left hand (L) into the operator's body, and this creates a field around the operator's right hand (R). The position-sensing electrodes are arranged underneath the keyboard and sense the strength of the field. This enables the position of the operator's right hand (R) in an X-Y plane above the keyboard to be determined. To this end the position-sensitive electrodes are connected via synchronous detectors (34, 44) and an analogue-to-digital converter (36) to a microprocessor (46), which operates to control the position of a cursor on the display screen.

15 Claims, 2 Drawing Sheets

POSITIONING A CURSOR ON THE DISPLAY SCREEN OF A COMPUTER

CROSS REFERENCE TO RELATED APPLICATIONS

Figure 1:
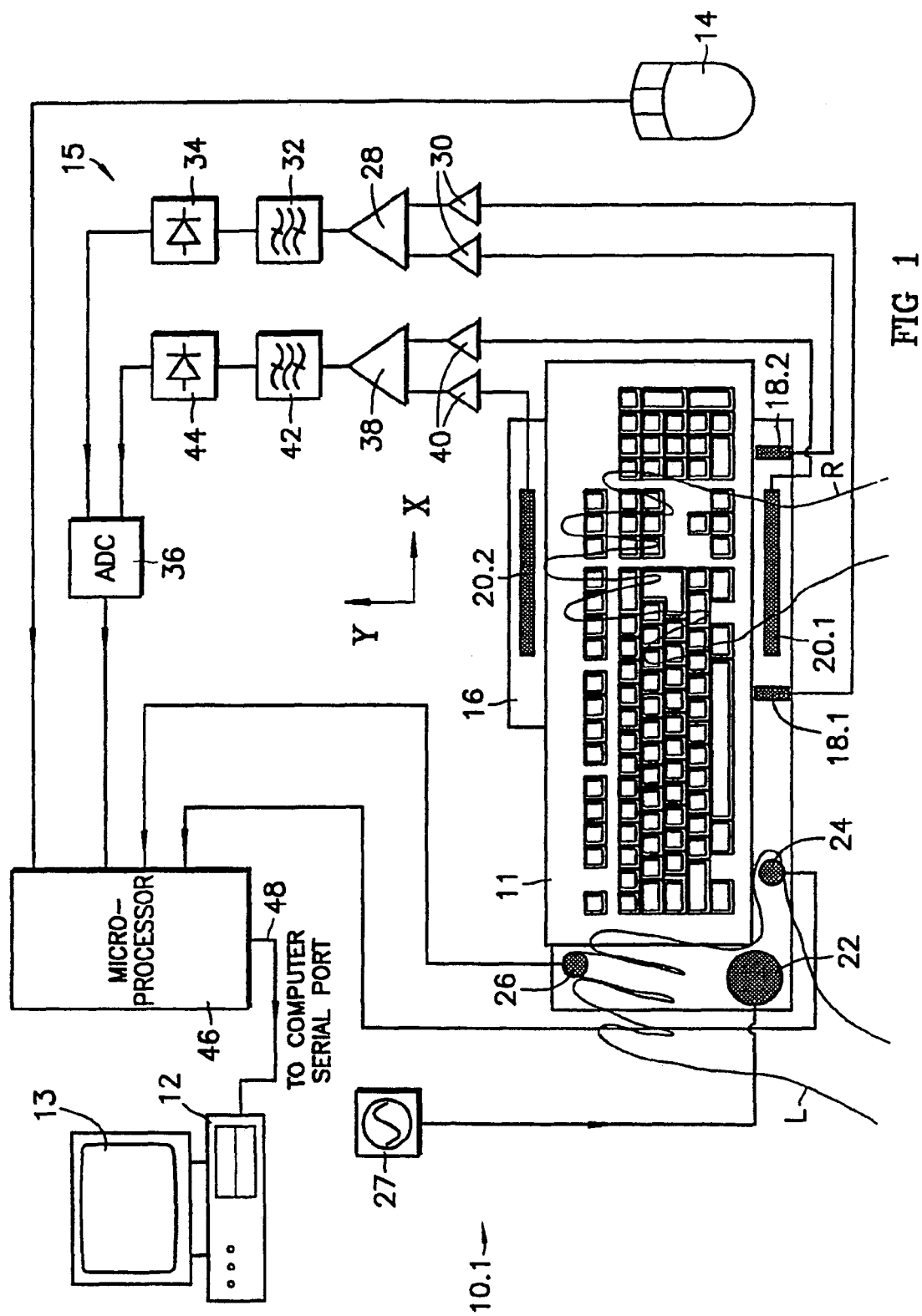

This is a continuation of U.S. application Ser. No. 10/298,025, filed Nov. 15, 2002, now U.S. Pat. No. 6,624,804, which is a continuation of U.S. application Ser. No. 09/684,149, filed Oct. 6, 2000 now abandoned which is a continuation and claims priority to International application No. PCT/IB99/00579 filed Apr. 6, 1999 and South African application No. 98/2910, filed Apr. 6, 1998.

This invention relates to a method of positioning a cursor on the display screen of a computer, under control of an operator, and to means for carrying out the method.

The term "cursor" is to be understood as encompassing a pointer or other device or symbol that is displayed on the display screen of a computer and can be moved about on the screen under control of the operator. A cursor could, for example, be used to point at or designate an icon or attribute displayed on the display screen and that is to be selected.

According to the invention there is provided a method of positioning a cursor on the display screen of a computer, under control of an operator, the method comprising the steps of:

establishing a field about a movable body part of the operator;

sensing the strength of the field at one or more predetermined positions in a fixed reference frame, thereby to provide a control variable corresponding to the position of the body part in the reference frame; and positioning the cursor on the display screen in response to the control variable.

The arrangement may then be such that the movable body part acts as a radiating antenna.

The movable body part may be one of the hands of the operator.

Where the movable body part is one of the hands of the operator, the field may be established by injecting an electrical signal into the operator's body via the other hand of the operator.

The strength of the field may be sensed by means of a first pair of position-sensing electrodes spaced apart in a first direction in the reference frame, to provide a first control variable corresponding to the position of the body part in the first direction, and a second pair of position-sensing electrodes spaced apart in a second direction perpendicular to the first direction, to provide a second control variable corresponding to the position of the body part in the second direction.

The term "electrode" is to be interpreted in a broad sense so as to include also an antenna.

The cursor may be positioned by moving it to a position on the display screen corresponding to the position of the body part in the reference frame, if the body part is within an imaginary boundary in the reference frame, and by continuing to mo%ee it along a line corresponding to the direction in which the body part approached the boundary, if the body part is at or beyond the boundary.

Further according to the invention there is provided a computer system which comprises a display screen, a keyboard for entry of data into the system, and positioning means for controlling the position of a cursor on the display screen, the positioning means comprising:

position-sensing electrodes placed in a fixed reference frame, for sensing the strength of a field established about a movable body part of an operator and thereby to provide a control variable corresponding to the position of the body part in the reference frame; and control means operative in response to the control variable to position the cursor on the display screen in accordance with the position of the body part in the reference frame.

Where said body part is one of the hands of the operator, the position-sensing electrodes may be so arranged with respect to the keyboard that the operator can control the position of the cursor by moving said hand in a hovering manner over the keyboard.

The system may further comprise a signal generator for generating an alternating electrical signal, and an injection electrode for injecting the electrical signal into the body of the operator and so establish the electrical field about said movable body part. Where said movable body part is one of the hands of the operator, the injection electrode may be arranged to inject the electrical signal into the body of the operator via the other hand of the operator.

The system may further comprise one or more click switches for operation by the operator. The click switch or switches may be arranged to be operated by said other hand of the operator.

The system may further comprise a conventional pointing device, and selection means for enabling the operator to select the conventional pointing device for controlling the position of the cursor on the display screen.

The invention extends to an accessory for use in positioning a cursor on the display screen of a computer, under control of an operator, the accessory comprising:

signal generating means for generating an electrical signal;

an injection electrode coupled to the signal generating means, for injecting the electrical signal into the body of the operator, thereby to establish a field about a movable body part of the operator;

position-sensing electrodes for placement in a fixed reference frame, for sensing the strength of the electrical field; and means coupled to the position-sensing electrodes for generating a control variable corresponding to the position of the body part in the reference frame, whereby the cursor can be positioned in response to the control variable.

The invention will now be described in more detail, by way of example, with reference to the accompanying diagrammatic drawings.

Figure 2:
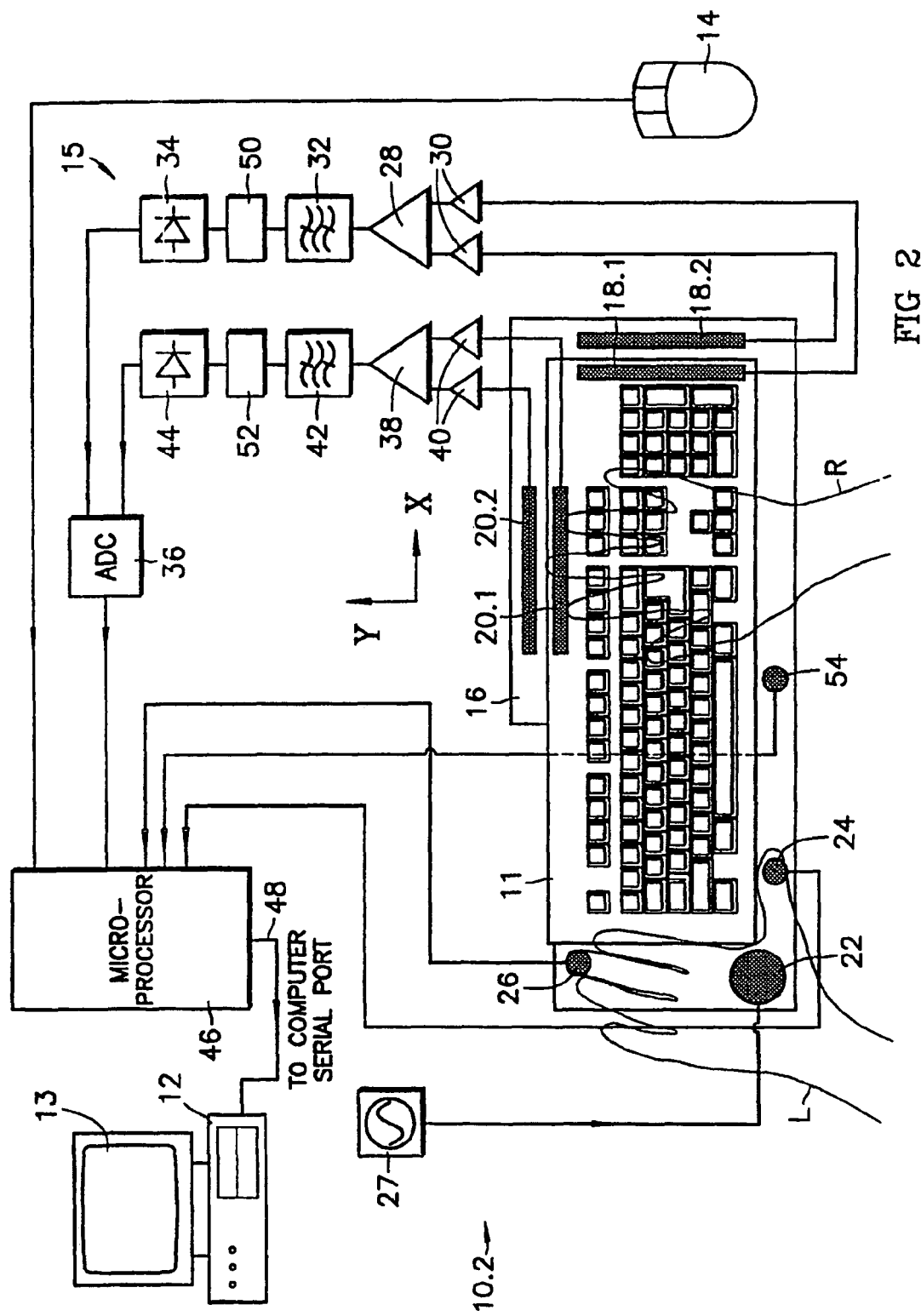

In the drawings:

FIG. 1 illustrates a computer system according to a first embodiment of the invention; and FIG. 2 illustrates a computer system according to a second embodiment of the invention.

Referring first to FIG. 1, reference numeral 10.1 generally designates a computer system comprising a personal computer (PC) of the portable or desk-top type. The PC comprises various components including a keyboard 11, a microprocessor, memory, and disc drives housed in a cabinet 12, a display device or monitor 13, and a pointing device in the form of a mouse 14. These can all be of the conventional type. In accordance with the invention, the computer system is further provided with an accessory 15 for use in controlling the PC, and more particularly the position of a cursor on the monitor 13. The keyboard 11 is connected to the rest of the PC in a conventional manner. The mouse 14 is connected to the rest of the PC via the accessory 15, in a manner that will be described in more detail hereinafter, The accessory 15 may be provided in a form in which it can readily be retrofitted to an existing, conventional PC. Thus, it may comprise a panel 16 which can be placed under the keyboard 11. On the panel 16 there are two pairs of spaced position-sensing electrodes, namely a first pair of electrodes 18.1 and 18.2, and a second pair of electrodes 20.1 and 20.2. The electrodes 18.1 and 18.2 are spaced in an X co-ordinate direction, i.e. along the length of the keyboard, and, as will be explained in more detail hereinafter, are thus able to detect the position of the operator's right hand R in the X co-ordinate direction. The electrodes 20.1 and 20.2 are spaced in the Y co-ordinate direction, i.e. in a direction perpendicular to the X co-ordinate direction, and are thus able to detect the position of the operator's right hand R in the Y co-ordinate direction. Towards the left hand side thereof the panel 16 is provided with a signal injection electrode 22 and a pair of click switches 24 and 26. The click switches 24 and 26, and signal injection electrode 22 are so arranged that, when the operator's left hand L is placed in position on the panel for operating the click switch 24 with the left thumb and the click switch 26 with one of the other left hand fingers, i.e. as illustrated in the drawing, the palm of the operator's left hand will be over the signal injection electrode 22.

It will be understood that the electrode pairs 18.1, 18.2 and 20.1, 20.2, as well as the electrode 22 and the click switches 24 and 26 can be made to form a built-in part of the keyboard 11. In this event the panel 16 can be omitted. It will also be understood 15 that further electrode pairs in addition to the electrode pairs 18.1, 18.2 and 20.1, 20.2 may be provided, so that the position of the right hand R in a third or Z co-ordinate direction, perpendicular to the X-Y plane, can also be determined. It will further be understood that further click switches, in addition to the click switches 24 and 26, may be provided.

The accessory 15 further comprises an oscillator 27 which, in operation, generates an electrical signal having a frequency of about 20 kHz. The output of the oscillator 27 is coupled to the signal injection electrode 22.

The click switches 24, 26 can be of the type that require physical actuation, as in the case of the click switches of a conventional mouse.

The electrodes 18.1 and 18.2 are coupled to the two inputs, respectively, of a difference amplifier 28, each via a high impedance buffer amplifier 30. The output of the difference amplifier 28 is fed via a band-pass filter 32 and a synchronous detector 34 to a first of the inputs of an analogue-to-digital converter (ADC) 36. Likewise, the electrodes 20.1 and 20.2 are connected to the two inputs, respectively, of a difference amplifier 38, each via a high impedance buffer amplifier 40, and the output of the difference amplifier 38 is connected via a band-pass filter 42 and a synchronous detector 44 to a second input of the analogue-to digital converter 36. The band-pass filters 32 and 42 each have a centre frequency which corresponds to the frequency of the oscillator 27.

The accessory 15 further comprises a microprocessor 46. The output of the analogue-to-digital converter 36 is connected to an input of the microprocessor 46. The click switches 24 and 26 are also connected to inputs of the microprocessor 46. Likewise, the mouse 14 is connected to an input of the microprocessor 46.

In one form of the invention the click switches 24, 26 are provided with touch-sensitive electrodes, the arrangement being such that the microprocessor 46 is, via these touch-sensitive electrodes, able to detect whether or not the operator's left hand is in the position illustrated in the drawing, i.e. in a position in which the operator's left thumb and fingers touch the click switches 24, 26. This is the position that is required for the signal from the oscillator 27 to be injected into the body of the operator via the signal injection electrode 22. It will be understood that the injection electrode 22 may be provided on a click or pressure switch, in which event this click or pressure switch will have the same effect as the click switches 24, 26.

The microprocessor 46 has an output 48 which is connected to a serial port of the PC.

Operation of the System will Now be Described

When the operator's left hand L is in the position illustrated in the drawing, the electrical signal generated by the oscillator 27 is injected via the signal injection electrode 22 into the operator's body. The injection may be effected by conduction, in which event physical contact with the electrode 22 will be required, or it may be effected by means of capacitive, electromagnetic, or radiation induction, in which event physical contact with the electrode 22 is not required. The injected signal creates an alternating electric field around the operator's body, including, via conduction through the operator's body, the operator's right hand R. The electrodes 18.1, 18.2 and 20.1, 20.2 are able to detect the strength (i.e. amplitude) of this field and, from this determine the position of the operator's right hand in the X and Y co-ordinate directions. This is done in conjunction with the difference amplifiers 28, 38 and the synchronous detectors 34, 44. Any extraneous signals are filtered out by the band-pass filters 32, 42, and the synchronous detectors 34, 44 provide analogue outputs corresponding to the position of the operator's right hand in, respectively, the X and Y co-ordinate directions. The two analogue signals, one provided by the synchronous detector 34 and the other by the synchronous detector 44, are fed to the analogue-to-digital converter 36, which converts the two signals to a digital form. The microprocessor 46 serves to convert the signal into a suitable data bit-stream. The protocol of the bit-stream may be such as to emulate a standard mouse protocol required by a conventional software mouse driver resident in the PC. The bit-stream is fed to a serial port of the PC via the output 48 and is interpreted by the computer as if it was reading data sent by a conventional mouse during normal mouse operation.

The information contained in the bit-stream could also be transmitted to the PC via an existing data link between the 30 keyboard and the PC, using suitable software.

The operator may operate the click switches 24, 26 in the same manner as that in which the click switches of a conventional mouse are operated.

While the operator's left hand L is in the position illustrated in the drawing, as detected by the touch sensitive electrodes on the switches 24, 26 referred to above, the microprocessor 46 operates to disable the conventional mouse 14.

Should the operator want to use the conventional mouse 14, the operator simply has to move his left hand away from the position illustrated in the drawing. This will be detected by the microprocessor 46 via the touch-sensitive electrodes on the click switches 24, 26, and causes the microprocessor to disable the input received from the analogue-to-digital converter 36 and, instead, switch over to the input received from the mouse 14.

The system may also operate through other forms of energy induced in the body of the operator, such as, for example, the 50 Hz normally used for mains power and which will normally be induced in the body of the operator via cables and other electrical equipment in the vicinity of the operator, or by any other non-contact injector.

Referring now to FIG. 2, reference numeral 10.2 generally indicates a computer system which is similar to the computer system 10.1, the same reference numerals being used to indicate the same or similar parts. The system 10.2 differs from the system 10.1 as follows hereunder.

First, the electrodes 18.1 and 18.2 are arranged so that they are both on one side, in the X direction, of the operator's right hand R, and the electrodes 20.1 and 20.2 are arranged so that they are both on one side, in the Y direction, of the operator's right hand R. This arrangement has the advantage that it renders the system less sensitive to electromagnetic noise and less sensitive to changes in the height of the operator's right hand above the keyboard 11, and that it is easier to implement physically than in the case of the electrode arrangement illustrated in FIG. 1.

Secondly, an analogue linearizer 50 is connected between the band-pass filter 32 and the synchronous detector 34. This is required to compensate for the non-linearity introduced by the fact that the electrodes 18.1 and 18.2 are both to one side of the operator's right hand instead of being on opposite sides of the hand as-in the FIG. 1 embodiment. Likewise, a linearizer 52 is connected between the band-pass filter 42 and the synchronous detector 44.

The compensation for non-linearity can also be effected digitally, in which event it can conveniently take place in the microprocessor 46.

Thirdly, the system 10.2 is provided with an auto calibration button 54 which is connected to an input of the microprocessor 46. It will be understood that the switch button 54 could also be in the form of a touch pad. When the switch button 54 is activated by means of the operator's right hand R, the microprocessor will perform a calibration function, correlating the position of the operator's right hand R and the cursor position on the computer screen 13. This is possible because the operator's right hand, when activating the switch button 54, will of necessity be in a known position in the X-Y plane.

The invention claimed is:

1. A position input device comprising:
    an oscillator that generates an oscillating injection signal for coupling to a first body part of a human body;
    a first input operable to receive a first position signal from a first position sensing electrode that senses a distance of the first position sensing electrode from a second body part in a non-contacting manner;
    a second input operable to receive a second position signal from a second position sensing electrode that senses a distance of the second position sensing electrode from the second body part in a non-contacting manner, the first and second position sensing electrodes being spaced from each other;
    a differential amplifier having first and second differential inputs connected to the first and second inputs to receive the first and second position signals;
    a processing device connected to the differential amplifier and operable to generate a distance signal in a first direction based on an output of the differential amplifier.

2. The position input device according to claim 1, wherein the distance signal is received by a computer to control a cursor on a display.

3. The position input device according to claim 1, wherein the processing device includes an analog-to-digital converter (ADC) connected to the differential amplifier and a processor connected to the output of the ADC.

4. An input device for controlling the position of a cursor on a display of a computer, the input device comprising:
    an oscillator that generates an oscillating signal;
    a signal injection electrode connected to the oscillator and operable to establish an electric field about a movable body part of an operator;
    at least one first position-sensing electrode positioned near a fixed reference frame defining an imaginary input boundary, for sensing the strength of the electric field in a non-contacting manner and thereby to provide a first control variable corresponding to the position of the movable body part in the reference frame in a first direction;
    at least one second position-sensing electrode positioned near the fixed reference frame and spaced from the at least one first position-sensing electrode, for sensing the strength of the electric field in a non-contacting manner and thereby to provide a second control variable corresponding to the position of the movable body part in the reference frame in the first direction;
    a differential amplifier having first and second differential inputs connected to the at least one first and second position-sensing electrodes; and
    a control circuit connected to the differential amplifier and operative in response to the first and second control variables to position the cursor on the display in accordance with the position of the movable body part.

5. The input device according to claim 4, further comprising a keyboard for entry of data and wherein the body part is one of the hands of the operator, and wherein the position-sensing electrodes are so arranged with respect to the keyboard that the operator can control the position of the cursor by moving the one hand in a hovering manner over the keyboard.

6. The input device according to claim 5, wherein the injection electrode is arranged to inject the electrical signal into the body of the operator via the other hand of the operator.

7. The input device according to claim 5, further comprising one or more click switches for operation by the operator.

8. The input device according to claim 7, wherein the click switch or switches are arranged to be operated by the other hand of the operator.

9. The input device according to claim 4, further comprising a pointing device and a selection device for enabling the operator to select either the pointing device or the input device for controlling the position of the cursor on the display.

10. A position input device comprising:
    an oscillator that generates an oscillating signal;
    a signal injection electrode connected to the oscillator and operable to establish an electric field about a movable body part of an operator;
    a first input operable to receive a first position signal from a first position sensing electrode that senses a position of the first position sensing electrode from the movable body part in a non-contacting manner;
    a second input operable to receive a second position signal from a second position sensing electrode that senses a position of the second position sensing electrode from the movable body part in a non-contacting manner, the first and second position sensing electrodes being spaced from each other; and a differential amplifier having first and second differential inputs respectively connected to the first and second inputs to receive the first and second position signals and to take the difference between the first and second position signals, wherein the output of the differential amplifier represents a position of the movable body part in a first direction.

11. The position input device according to claim 10, further comprising a bandpass filter connected to the differential amplifier and having a center frequency corresponding to the frequency of the oscillator.

12. The position input device according to claim 10, further comprising a synchronous detector connected to the differential amplifier.

13. The position input device according to claim 10, further comprising:

a bandpass filter connected to the differential amplifier and having a center frequency corresponding to the frequency of the oscillator; and a synchronous detector connected to the differential amplifier.

14. The position input device according to claim 13, further comprising first and second high gain buffer amplifiers connected between the first and second inputs and the differential amplifier.

15. The position input device according to claim 10, wherein the signal injection electrode is coupled to one hand of the operator and the electric field is established about the other hand of the operator.

* * * * *